(12) United States Patent
Pham et al.

(10) Patent No.: US 10,860,244 B2
(45) Date of Patent: Dec. 8, 2020

(54) METHOD AND APPARATUS FOR MULTI-LEVEL MEMORY EARLY PAGE DEMOTION

(71) Applicant: Intel Corporation, Santa Clara, CA (US)

(72) Inventors: Binh Pham, Hillsboro, OR (US); Christopher B. Wilkerson, Portland, OR (US); Alaa R. Alameldeen, Hillsboro, OR (US); Zeshan A. Chishti, Hillsboro, OR (US); Zhe Wang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 15/854,357

(22) Filed: Dec. 26, 2017

(65) Prior Publication Data

US 2019/0042145 A1 Feb. 7, 2019

(51) Int. Cl.
| | | |
|---|---|---|
| *G06F 3/06* | (2006.01) | |
| *G06F 12/0862* | (2016.01) | |
| *G06F 12/0871* | (2016.01) | |
| *G06F 12/1027* | (2016.01) | |
| *G06F 12/0897* | (2016.01) | |
| *G06F 12/1045* | (2016.01) | |
| *G06F 12/128* | (2016.01) | |

(Continued)

(52) U.S. Cl.
CPC .......... *G06F 3/0656* (2013.01); *G06F 3/061* (2013.01); *G06F 3/0683* (2013.01); *G06F 12/0862* (2013.01); *G06F 12/0871* (2013.01); *G06F 12/0897* (2013.01); *G06F 12/1027* (2013.01); *G06F 12/1045* (2013.01); *G06F 12/128* (2013.01); *G06F 12/123* (2013.01); *G06F 12/1441* (2013.01); *G06F 2212/1016* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 5,912,839 | A | 6/1999 | Ovshinsky et al. |
| 6,035,432 | A | 3/2000 | Jeddeloh |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

Ramos et al. (Page Placement in Hybrid Memory Systems), ACM 978-1-4503-0102; pp. 85-95 (Year: 2011).*

(Continued)

*Primary Examiner* — Kaushikkumar M Patel
(74) *Attorney, Agent, or Firm* — Compass IP Law PC

(57) ABSTRACT

An apparatus is described that includes a memory controller to couple to a multi-level memory characterized by a faster higher level and a slower lower level. The memory controller having early demotion logic circuitry to demote a page from the higher level to the lower level without system software having to instruct the memory controller to demote the page and before the system software promotes another page from the lower level to the higher level.

15 Claims, 12 Drawing Sheets

(51) Int. Cl.
G06F 12/14 (2006.01)
G06F 12/123 (2016.01)

(56) References Cited

U.S. PATENT DOCUMENTS

| | | | |
|---|---|---|---|
| 6,292,874 B1 | 9/2001 | Barnett | |
| 7,590,918 B2 | 9/2009 | Parkinson | |
| 7,600,078 B1 | 10/2009 | Cen et al. | |
| 7,756,053 B2 | 7/2010 | Thomas et al. | |
| 7,774,556 B2 | 8/2010 | Karamcheti et al. | |
| 7,913,147 B2 | 3/2011 | Swaminathan et al. | |
| 8,051,253 B2 | 11/2011 | Okin et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,605,531 B2 | 12/2013 | Kau | |
| 8,607,089 B2 | 12/2013 | Qawami et al. | |
| 8,612,676 B2 | 12/2013 | Dahlen et al. | |
| 8,612,809 B2 | 12/2013 | Casper et al. | |
| 8,626,997 B2 | 1/2014 | Qawami et al. | |
| 8,649,212 B2 | 2/2014 | Kau et al. | |
| 8,838,935 B2 | 9/2014 | Hinton et al. | |
| 9,087,584 B2 | 7/2015 | Dahlen et al. | |
| 9,317,429 B2 | 4/2016 | Ramanujan et al. | |
| 9,342,453 B2 | 5/2016 | Nale et al. | |
| 9,378,133 B2 | 6/2016 | Nachimuthu et al. | |
| 9,378,142 B2 | 6/2016 | Ramanujan et al. | |
| 9,430,372 B2 | 8/2016 | Nachimuthu et al. | |
| 9,529,708 B2 | 12/2016 | Puthiyedath et al. | |
| 9,583,182 B1 | 2/2017 | Wilkerson et al. | |
| 9,600,407 B2 | 3/2017 | Faber | |
| 9,600,416 B2 | 3/2017 | Ramanujan et al. | |
| 9,619,408 B2 | 4/2017 | Nale et al. | |
| 9,690,493 B2 | 6/2017 | Dahlen et al. | |
| 2003/0023825 A1* | 1/2003 | Woo | G06F 12/023 711/170 |
| 2005/0273584 A1 | 12/2005 | Wisecup et al. | |
| 2007/0005922 A1 | 1/2007 | Swaminathan et al. | |
| 2007/0067382 A1* | 3/2007 | Sun | G06F 12/0862 709/203 |
| 2007/0255891 A1 | 11/2007 | Chow et al. | |
| 2008/0016269 A1 | 1/2008 | Chow et al. | |
| 2008/0034148 A1 | 2/2008 | Gower et al. | |
| 2008/0082766 A1 | 4/2008 | Okin et al. | |
| 2008/0109629 A1* | 5/2008 | Karamcheti | G06F 9/5016 711/170 |
| 2008/0235443 A1 | 9/2008 | Chow et al. | |
| 2008/0270811 A1 | 10/2008 | Chow et al. | |
| 2009/0119498 A1 | 5/2009 | Narayanan | |
| 2009/0313416 A1 | 12/2009 | Nation | |
| 2010/0110748 A1 | 5/2010 | Best | |
| 2010/0131827 A1 | 5/2010 | Sokolov et al. | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0047365 A1 | 2/2011 | Hentosh et al. | |
| 2011/0060869 A1 | 3/2011 | Schuette | |
| 2011/0153916 A1 | 6/2011 | Chinnaswamy et al. | |
| 2011/0208900 A1 | 8/2011 | Schuette et al. | |
| 2011/0291884 A1 | 12/2011 | Oh et al. | |
| 2012/0023300 A1* | 1/2012 | Tremaine | G06F 12/1009 711/162 |
| 2013/0227218 A1* | 8/2013 | Chang | G06F 12/0866 711/118 |
| 2013/0268741 A1 | 10/2013 | Daly et al. | |
| 2013/0275661 A1 | 10/2013 | Zimmer et al. | |
| 2013/0282967 A1 | 10/2013 | Ramanujan | |
| 2013/0290597 A1 | 10/2013 | Faber | |
| 2014/0019677 A1* | 1/2014 | Chang | G06F 12/0804 711/105 |
| 2014/0032818 A1* | 1/2014 | Chang | G06F 3/0685 711/103 |
| 2014/0129767 A1 | 5/2014 | Ramanujan et al. | |
| 2014/0297938 A1 | 10/2014 | Puthiyedath et al. | |
| 2015/0074339 A1* | 3/2015 | Cheriton | G06F 12/0804 711/103 |
| 2015/0121024 A1* | 4/2015 | Kolvick | G06F 3/0647 711/162 |
| 2015/0199126 A1* | 7/2015 | Jayasena | G11C 11/005 711/103 |
| 2016/0034195 A1* | 2/2016 | Li | G06F 13/382 711/117 |
| 2016/0085585 A1* | 3/2016 | Chen | G06F 12/08 711/154 |
| 2016/0269501 A1* | 9/2016 | Usgaonkar | H04L 67/2842 |
| 2016/0342363 A1* | 11/2016 | Krause | G06F 12/0804 |
| 2017/0031821 A1 | 2/2017 | Ramanujan et al. | |
| 2017/0068304 A1* | 3/2017 | Lee | G06F 1/3287 |
| 2017/0139649 A1 | 5/2017 | Puthiyedath et al. | |
| 2017/0249250 A1 | 8/2017 | Ramanujan et al. | |
| 2017/0249266 A1 | 8/2017 | Nale et al. | |
| 2018/0024923 A1* | 1/2018 | Hassan | G06F 9/5016 711/203 |
| 2018/0107598 A1* | 4/2018 | Prodromou | G06F 12/0811 |
| 2018/0136838 A1* | 5/2018 | White | G06F 3/061 |
| 2018/0336142 A1* | 11/2018 | Pellegrini | G06F 12/128 |
| 2018/0365167 A1* | 12/2018 | Eckert | G06F 12/1036 |

FOREIGN PATENT DOCUMENTS

| | | |
|---|---|---|
| CN | 101620539 B | 12/2013 |
| WO | 2005002060 A2 | 1/2005 |

OTHER PUBLICATIONS

Bock et al. (Concurrent Page Migration for Mobile Systems with OS-Managed Hybrid Memory) ACM 978-1-4503-2870-8, pp. 10 (Year: 2014).*

Su et al. (HpMC: An Energy-aware Management System of Multi-level Memory Architectures). ACM ISBN 123-4567-24-567/08/06, Oct. 5-8, 2015, pp. 167-178 (Year: 2015).*

H.H.S. Lee, et al., "Eager Writeback—A Technique for Improving Bandwidth Utilization", Proceedings 33rd Annual IEEE/ACM International Symposium On Microarchitecture, MICRO-332000, Monterey, Ca, 2000, pp. 11-21.

Oskin, Mark, et al., "A Software-Managed Approach to Die-Stacked DRAM", International Conference on Parallel Architectures and Compilation Techniques (PACT), San Francisco, CA, Oct. 2015.

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr-oceedings.sub.--Chrono.sub.--2011.html, Flash Memory Summit 2011 Proceedings, Aug. 11, 2011.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al, "Better I/0 Through Byte-Addressable, Persistent Memory", SOSP '09, Oct. 11, 2009, pp. 133-146. Big Sky, Montana, USA.

(56) References Cited

OTHER PUBLICATIONS

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

Mearian, "IBM announces computer memory breakthrough Phase-change memory offers 100 times the write performance of Nano flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

Quereshi et al., "Scalable High Performance Main Memory System Using Phase-Change Memory Technology", ISCA '09, Jun. 20, 2009, 10 pgs., Austin, Texas, USA.

Raoux et al., "Phase-Change Random Access Memory: A Scalable Technology," IBM Journal of Research and Development, vol. 52, Issue 4, pp. 465-479, Jul. 2008.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

\* cited by examiner

METHOD AND APPARATUS FOR MULTI-LEVEL MEMORY EARLY PAGE DEMOTION

FIELD OF INVENTION

The field of invention pertains generally to the computing sciences and, more specifically, to a method and apparatus for multi-level memory early page demotion

BACKGROUND

A pertinent issue in many computer systems is the system memory (also referred to as "main memory"). Here, as is understood in the art, a computing system operates by executing program code stored in system memory and reading/writing data that the program code operates on from/to system memory. As such, system memory is heavily utilized with many program code and data reads as well as many data writes over the course of the computing system's operation. Finding ways to improve system memory accessing performance is therefore a motivation of computing system engineers.

FIGURES

A better understanding of the present invention can be obtained from the following detailed description in conjunction with the following drawings, in which.

DETAILED DESCRIPTION

Figure 1:
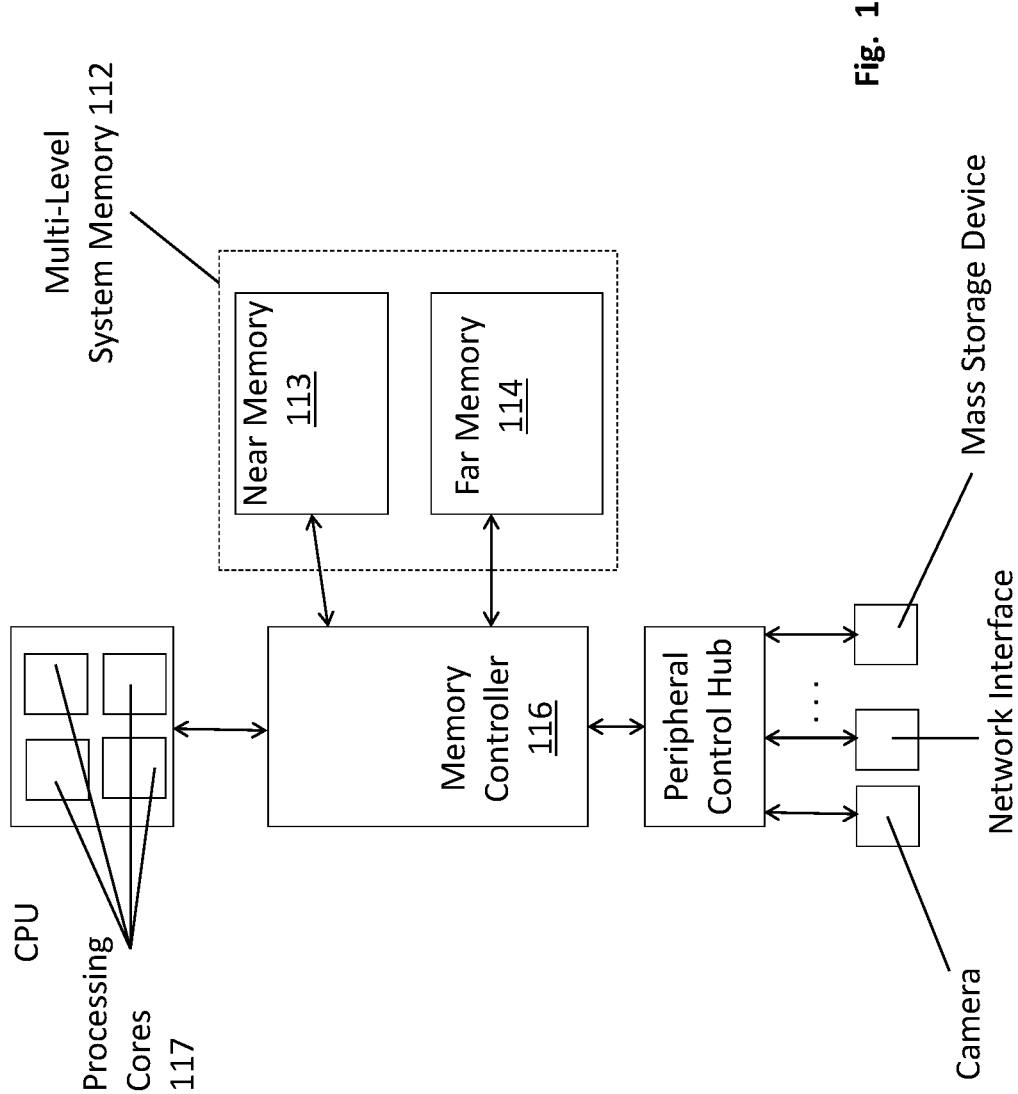
FIG. 1 shows a computing system having a multi-level system memory.

FIG. 1 shows an embodiment of a computing system 100 having a multi-tiered or multi-level system memory 112. According to various embodiments, a smaller, faster near memory 113 (e.g., higher bandwidth and/or small access time(s), etc.) may be utilized as a cache for a larger, slower far memory 114 (e.g., lower bandwidth and/or large access time(s), etc.). In various embodiments, near memory 113 is used to store the more frequently accessed items of program code and/or data that are kept in system memory 112. By storing the more frequently used items in near memory 113, the system memory 112 will be observed as faster because the system will often read/write from/to items that are being stored in faster near memory 113.

According to various embodiments, near memory 113 has lower access times than the lower tiered far memory 114 For example, the near memory 113 may exhibit reduced access times by having a faster clock speed than the far memory 114. Here, the near memory 113 may be a faster (e.g., lower access time), volatile system memory technology (e.g., high performance dynamic random access memory (DRAM) and/or SRAM memory cells) co-located with the memory controller 116. By contrast, far memory 114 may be either a volatile memory technology implemented with a slower clock speed (e.g., a DRAM component that receives a slower clock) or, e.g., a non volatile memory technology that is slower (e.g., longer access time) than volatile/DRAM memory or whatever technology is used for near memory.

For example, far memory 114 may be comprised of an emerging non volatile random access memory technology such as, to name a few possibilities, a phase change based memory, a three dimensional crosspoint memory, "write-in-place" non volatile main memory devices, memory devices having storage cells composed of chalcogenide, multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc. Any of these technologies may be byte addressable so as to be implemented as a system memory in a computing system (also referred to as a "main memory") rather than traditional block or sector based non volatile mass storage.

Emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than only larger based "block" or "sector" accesses associated with traditional, non volatile mass storage (e.g., solid state drive (SSD), hard disk drive (HDD)), and/or, otherwise acts as a byte addressable memory that the program code being executed by processor(s) of the CPU operate out of.

In various embodiments, system memory may be implemented with dual in-line memory module (DIMM) cards where a single DIMM card has both volatile (e.g., DRAM) and (e.g., emerging) non volatile memory semiconductor chips disposed on it. In other configurations DIMM cards having only DRAM chips may be plugged into a same system memory channel (e.g., a double data rate (DDR) channel) with DIMM cards having only non volatile system memory chips.

In another possible configuration, a memory device such as a DRAM device functioning as near memory 113 may be assembled together with the memory controller 116 and processing cores 117 onto a single semiconductor device (e.g., as embedded DRAM) or within a same semiconductor package (e.g., stacked on a system-on-chip that contains, e.g., the CPU, memory controller, peripheral control hub, etc.). Far memory 114 may be formed by other devices, such as slower DRAM or non-volatile memory and may be attached to, or integrated in the same package as well. Alternatively, far memory may be external to a package that contains the CPU cores and near memory devices. A far memory controller may also exist between the main memory controller and far memory devices. The far memory controller may be integrated within a same semiconductor chip package as CPU cores and a main memory controller, or, may be located outside such a package (e.g., by being integrated on a DIMM card having far memory devices).

In various embodiments, at least some portion of near memory 113 has its own system address space apart from the system addresses that have been assigned to far memory 114 locations. In this case, the portion of near memory 113 that has been allocated its own system memory address space acts, e.g., as a higher priority level of system memory (because it is faster than far memory). In further embodiments, some other portion of near memory 113 may also act as a memory side cache (that caches the most frequently accessed items from main memory (which may service more than just the CPU core(s) such as a GPU, peripheral, network interface, etc.) or last level CPU cache (which only services CPU core(s)).

Figure 2:
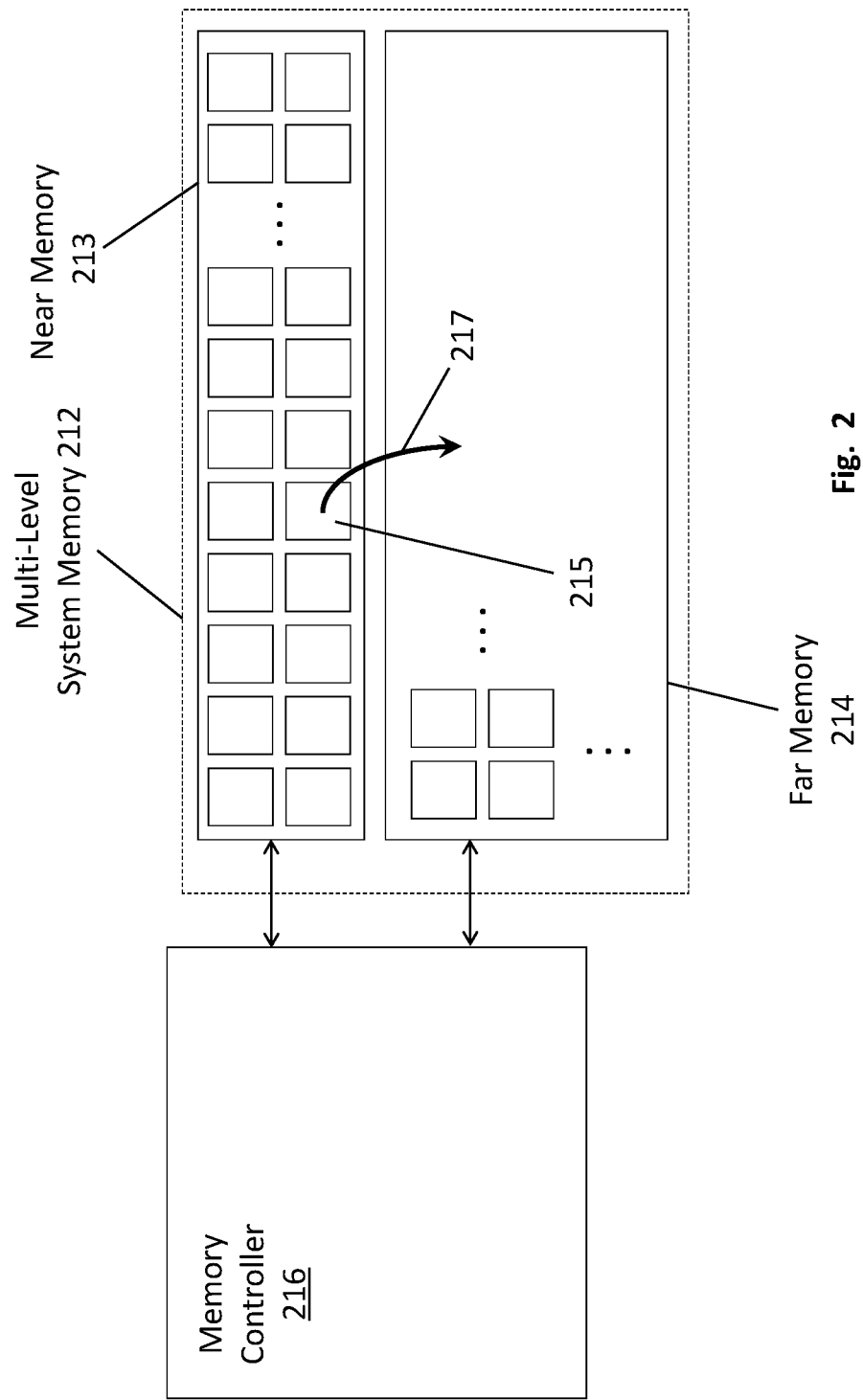
FIG. 2 shows a potential inefficiency of a computing system having a multi-level system memory.

FIG. 2 pertains to a potential inefficiency that can happen in a 2LM system in which system software is responsible for managing which pages of information are kept in the near memory 213 and which pages of information are kept in far memory 214.

Here, as is known in the art, in a traditional computer system, the program code and/or data of a software program is kept on one or more "pages" of information. When a software program is to be executed by the computing systems CPU core(s), one or more of the software program's pages are called up from non-volatile mass storage (e.g., a disk-drive) by the system software and written into system memory. The CPU core(s) then issue memory read requests for program code and memory read and write requests for data that are on the pages in order to physically execute the software program out of system memory.

In the case of the 2LM system of FIG. 2, the respective pages of a computing system's software programs can be executed out of both the near memory 213 and the far memory 214 by the CPU core(s). In various implementations an operating system, operating system instance and/or virtual machine monitor (hereinafter, "system software") is responsible for determining which pages are to be stored in near memory 213 and which pages are to be stored in far memory 214.

Ideally, the more frequently accessed pages will be placed in near memory 213 instead of the far memory 214 because of the near memory's faster access times. As such, in various embodiments, the system software will place frequently used and/or currently active pages in near memory 213 as best as is practicable.

Accordingly, when pages in far memory 214 are identified by the system software as being frequently used (e.g., as measured by number of accesses over a time window) or currently active (e.g., as measured from the addresses of current read/write requests), the system software may desire to move such pages from the far memory 214 to the near memory 213. So doing, however, particularly when near memory 213 is full and does not have any free space to accept a new page without demoting another page from near memory 213 to far memory 214, can create system bottlenecks.

Here, the above described process entails: 1) shooting down translation look-aside (TLB) buffer entries in the CPUs to reflect the new physical address of the demoted page from a near memory physical address to a far memory physical address (explained in more detail further below); 2) moving a large amount of information from near memory to far memory (i.e., the demoted page's information which may be many kilobytes (KBs) or possibly even mega bytes (MBs)); 3) shooting down TLB entries in the CPUs to reflect the new physical address of the promoted page from a far memory physical address to a near memory physical address; and 4) moving a large amount of information from far memory to near memory (i.e., the promoted page's information which may be many kilobytes (KBs) or possibly even mega bytes (MBs)).

Here, in a situation where a page 215 has to be demoted 217 from near memory 213 in order to make room in the near memory 213 for a page that is to be promoted to near memory 213 from far memory 214, the system software has to intercede to perform the successful page movement which not only entails the issuance of the appropriate read/write requests to physically swap the pair of pages' worth of information between the two memories but also has to temporarily stall the CPUs to update their respective TLBs.

As is known in the art, a CPU instruction execution pipeline typically includes a memory management unit that keeps a TLB. The TLB is essentially a table that records which virtual addresses map to which actual, physical addresses in system memory 212. Here, software program code is typically written to refer to memory as if it keeps little/no other software. As such, for example, many software programs are written to initially refer to a base memory address of 0000 and then incrementally add addresses as needed. More than one software program written in such a manner could not operate out of a same memory (their "virtual" addresses would collide).

Therefore a TLB is used to translate each virtual address specified by a particular software program/thread into a physical memory address where the information referred to by the virtual address actually resides in system memory 212. By mapping numerically identical virtual addresses of different software programs to different system memory physical addresses, two different software programs with substantially over-lapping virtual address space can easily operate out of two different physical address regions of a same system memory 212.

When a page of information for a particular software program is moved from one memory location to another (e.g., from near memory 213 to far memory 214 or vice-versa), the TLB entries maintained by the CPU cores for the page must be updated to reflect the new physical location of the page within the memory 212. Updating a TLB can negatively impact CPU instruction execution pipeline performance because, e.g., the execution of memory read/write instructions is stalled waiting for the TLB to be updated.

Here, negative performance implications may result if page swapping to effect promotion of a page from far memory 214 to near memory 213 is performed in an instantaneous, impromptu and/or reactionary per page fashion ("fine grained"). That is, if the system software is frequently deciding that certain far memory pages should be promoted to near memory 213 when near memory 213 is full in combination with the system software being designed merely to react to each such decision by immediately directing a corresponding page swap and associated TLB shootdowns, then, the overall performance of the computing system may noticeably degrade because the system memory 212 will be unavailable more regularly moving large amounts of data between near memory 213 and far memory 214 to effect the page swaps, and, the CPU instruction execution pipelines will be stalled more regularly waiting for the TLB shootdowns to be fully processed.

Figure 3:
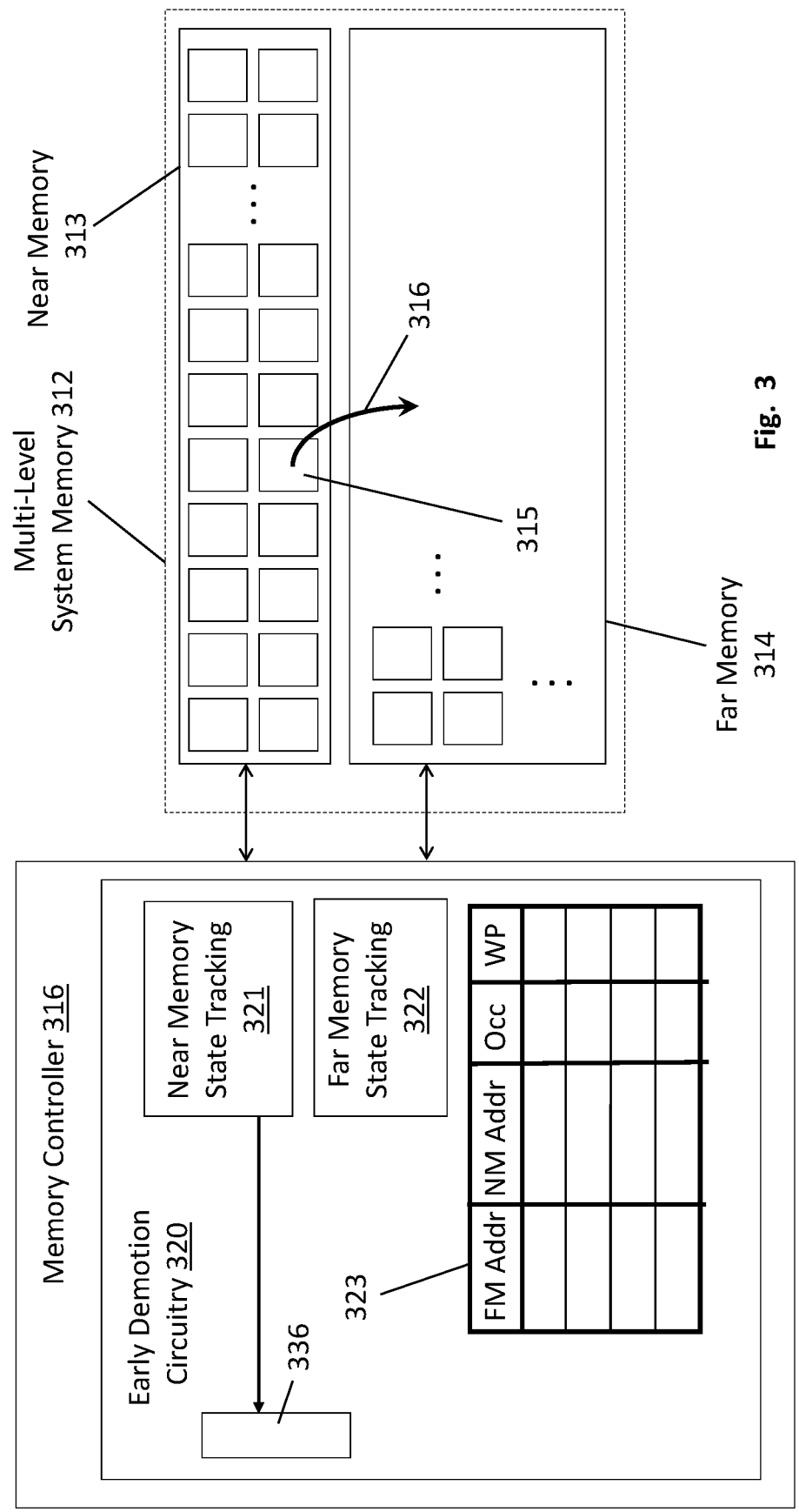
FIG. 3 shows a memory controller for a multi-level memory having early demotion logic circuitry.

FIG. 3 shows an improved approach that implements a more coarse grained near memory 313 to far memory 314 page demotion process. Here, as can be seen in FIG. 3, the memory controller 316 includes early demotion logic circuitry 320. The early demotion logic circuitry 320 includes near memory state tracking circuitry 321, far memory state tracking circuitry 322 and an early write remapping buffer 323. In various embodiments, the state tracking circuits 321, 322 and early write remapping buffer 323 are integrated as components of a main memory controller on a system-on-chip having multiple (e.g., general purpose) processing cores, a peripheral control hub and other circuitry (e.g., a graphics processing unit (GPU)).

In other embodiments at least some portion of these circuits are implemented off of such a chip. For instance, in the case where the far memory 314 is implemented with emerging non volatile memory chips, a far memory controller may be locally coupled to such memory chips off the main system-on-chip die (e.g., on one or more DIMMs having the emerging non volatile memory chips). Here, the far memory controller(s) may include the far memory state tracking circuitry 322 or some portion thereof. Alternatively or in combination, the near memory state tracking circuitry 322 or some portion thereof may be disposed outside such a chip (e.g., on one or more DIMMs having the volatile (e.g., DRAM) memory chips where such DIMM(s) may even include emerging non volatile memory chips and even the far memory state tracking circuitry 322 or some portion thereof). In various possible packaging scenarios, even if such circuits are located off a system-on-chip as described above they may nevertheless exist within the same package as the system-on-chip (e.g., such as in a same semiconductor chip package where memory chips and associated external logic from the system-on-chip are integrated in a stacked chip solution).

The early demotion logic circuitry 320 seeks to start the eviction process sooner by physically demoting pages that are "next in line to be evicted" from near memory 313 but have not, as of yet, been formally evicted from near memory 313 by system software because system software has not yet identified a next page (or pages) to be promoted from far memory 314 to near memory 313.

That is, the early demotion logic 320 physically demotes pages from near memory 313 that are expected to be demoted from near memory 313 in the near future but have not actually been demoted by system software yet. By actually demoting the pages from near memory 313 before the system software explicitly commands their demotion, the underlying hardware is able to implement the demotion more opportunistically. That is, for instance, if the early demotion logic circuitry 320 is able to begin the process of demoting 316 a page 315, e.g., a few seconds before the system software actually decides to demote the page 315, the memory controller 316 has a few seconds to write the page 315 into a far memory location when the far memory resources used to access that location are idling. By writing a demoted page 315 opportunistically, the aforementioned system bottleneck induced by instantaneous, impromptu and/or reactionary per page data movement decisions can be noticeably lessened.

Moreover, as described in more detail below, the early write remapping buffer 323 allows the hardware to operate correctly in advance of any TLB updates. That is, a page 315 can be demoted to far memory 314 and be successfully accessed afterward before its corresponding TLB entry is updated by system software. As a consequence, proper hardware operation is not tightly coupled to correct TLB state. The system software can therefore update the CPU TLBs downstream "in batches" in which multiple TLB entries are updated for multiple demoted pages during a single TLB update cycle. Thus, for any imposed stall of an instruction execution pipeline to update a TLB, multiple entries are concurrently updated within the TLB rather than imposing a separate stall for each entry needing an update. In this respect, the page demotion process of the improved system of FIG. 3 is more forward looking, drawn-out and/or page-grouped ("coarse grained").

FIGS. 4a through 4g depict an end-to-end page swapping process consistent with the teachings above. As observed in FIG. 4a, initially, the system software sends system memory page addresses 431 to the memory controller 416 that the memory controller 416 understands are "free" pages within far memory 414. That is, with the system software being ultimately responsible for the memory management of the system, the system software is able to identify in advance which spaces in far memory 414 are available to store pages that have been demoted from near memory 413. The system software sends addresses 431 for these spaces to the memory controller 416 which keeps them for later use in the early write remapping buffer 423.

Figure 4A:
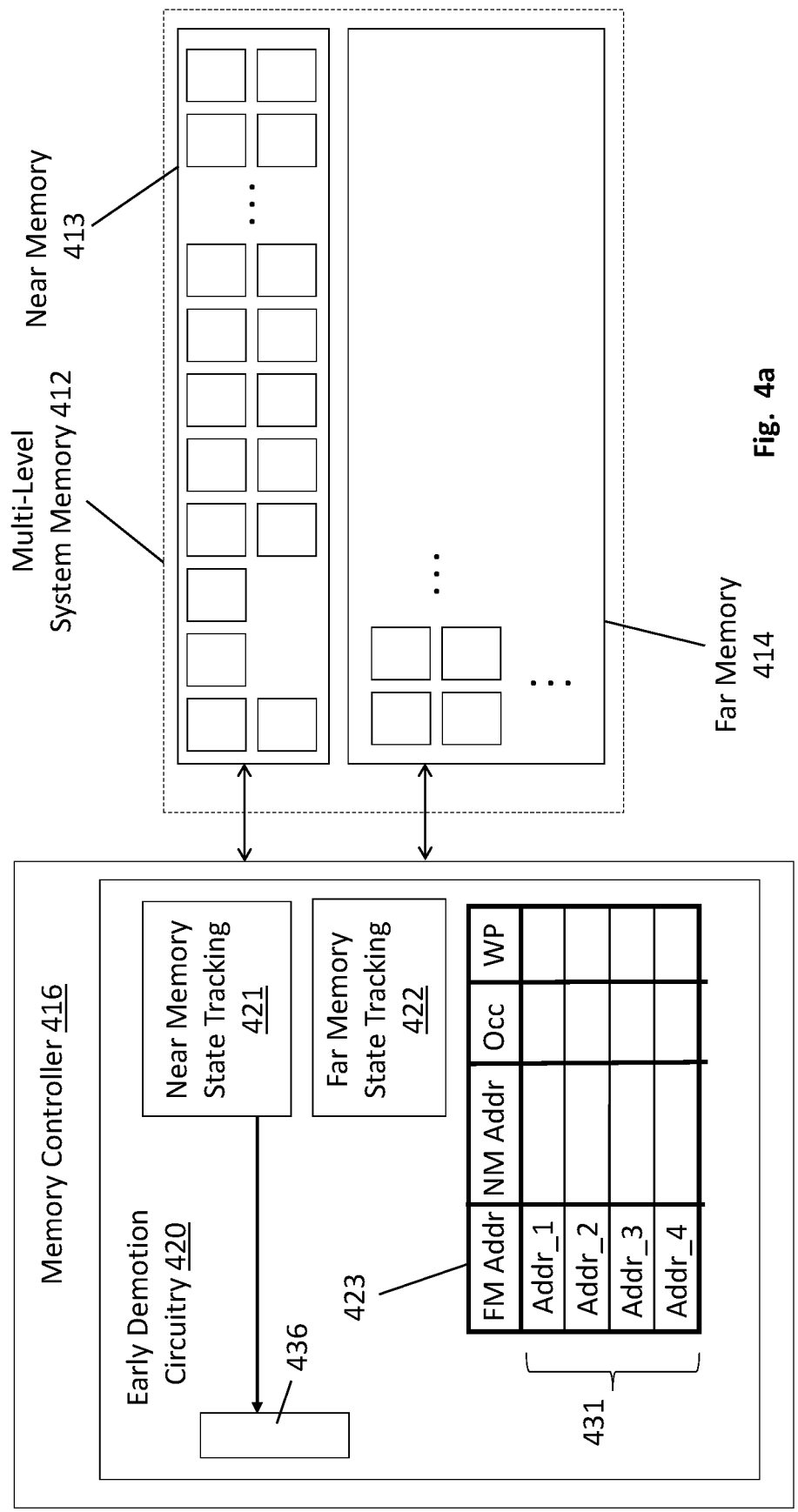
FIGS. 4a, 4b, 4c, 4d, 4e, 4f and 4g show an early page demotion process.

As observed in FIG. 4a, the early eviction logic circuitry 420 includes near memory state tracking circuitry 421. The near memory state tracking circuitry 421 identifies how many pages are currently in near memory 413 and identifies which page(s) are next in line to be demoted from near memory 413. In various embodiments, the page(s) that are next in line to be demoted are least recently used (LRU) pages. That is, pages that have sat in near memory 413 the longest without having any read or write accesses directed to them. Other algorithms alternative to or in combination with LRU may be used to identify which pages are to be demoted from near memory ahead of other pages (e.g., some pages may be associated with higher priority programs than other pages and are therefore not eligible for eviction (are "pinned" to near memory, etc.)).

The near memory state tracking circuitry 421 also tracks how many pages are in near memory 413 and/or how many free pages exist in near memory 413. Each free page corresponds to unused memory capacity in near memory 413 that could be used to accept a page that has been promoted to near memory 413 from far memory 414. In various embodiments, if the number of pages in near memory 413 exceeds some threshold and/or if the number of free pages in near memory 413 falls below some threshold, then early demotion activity is triggered. As of the near memory state in FIG. 4a no such threshold is surpassed. As such no early eviction process is initiated.

Figure 4B:
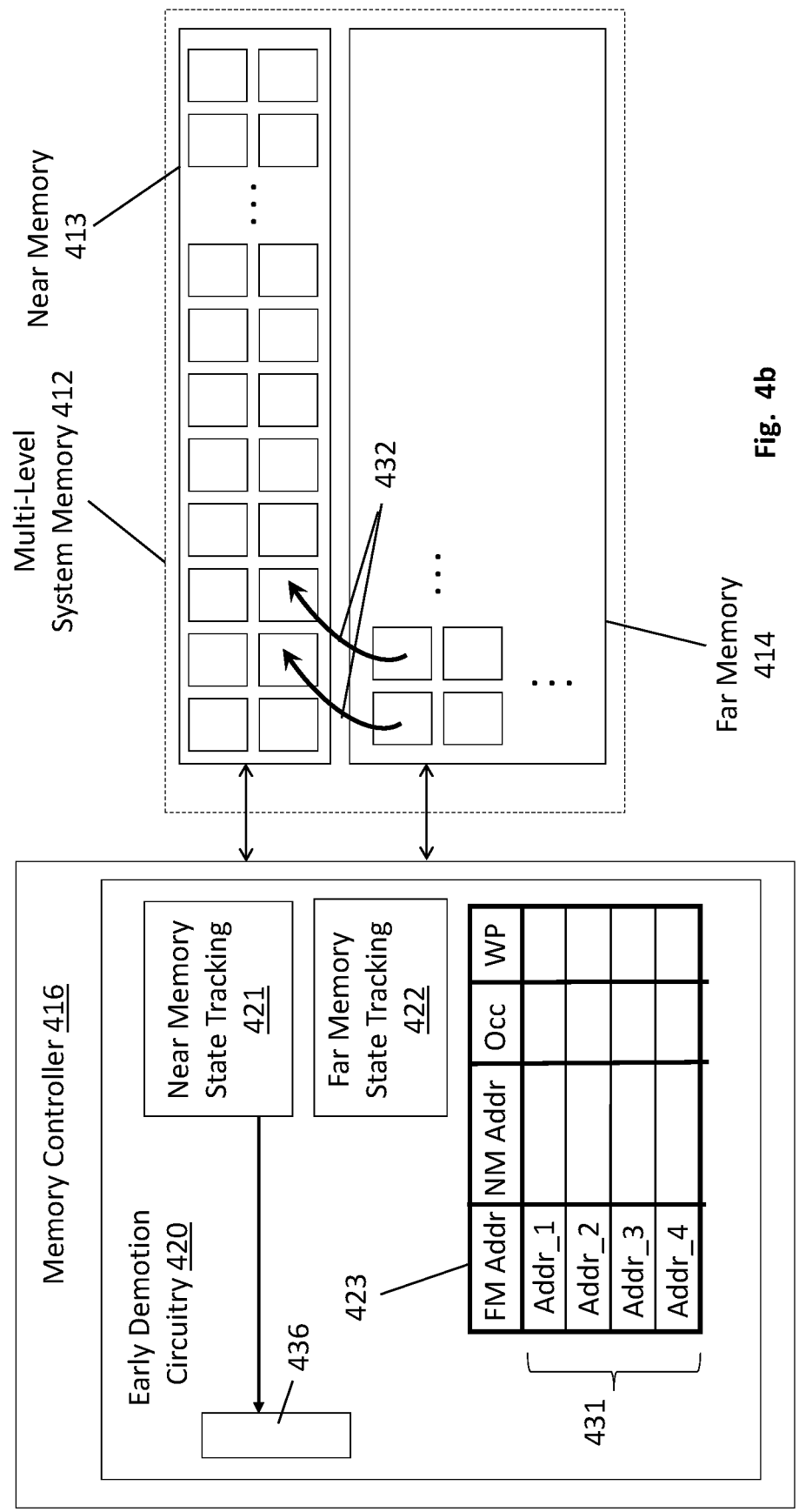

FIG. 4b shows the subsequent promotion of multiple pages 432 from far memory 414 to near memory 413. Because system software understands how many pages are in near memory 413 (because it ultimately determines which pages are promoted to near memory), system software understands there is free space in near memory 413. As such, system software does not command any pages to be demoted from near memory 413 as a consequence of the promotions 432 to near memory 413 from far memory 414. However, as can be seen in FIG. 4b, the promotion of the pages 432 causes the near memory to be filled or near filled with pages. As such, the aforementioned near memory threshold(s) is(are) surpassed and the early demotion logic begins its early demotion process. For simplicity, the instant example assumes that only one page is to be early-demoted but other embodiments may be designed to early-demote more than one page when such threshold(s) is/are crossed or throttle how many pages are early-demoted based on how little free space remains in near memory 413.

Figure 4C:
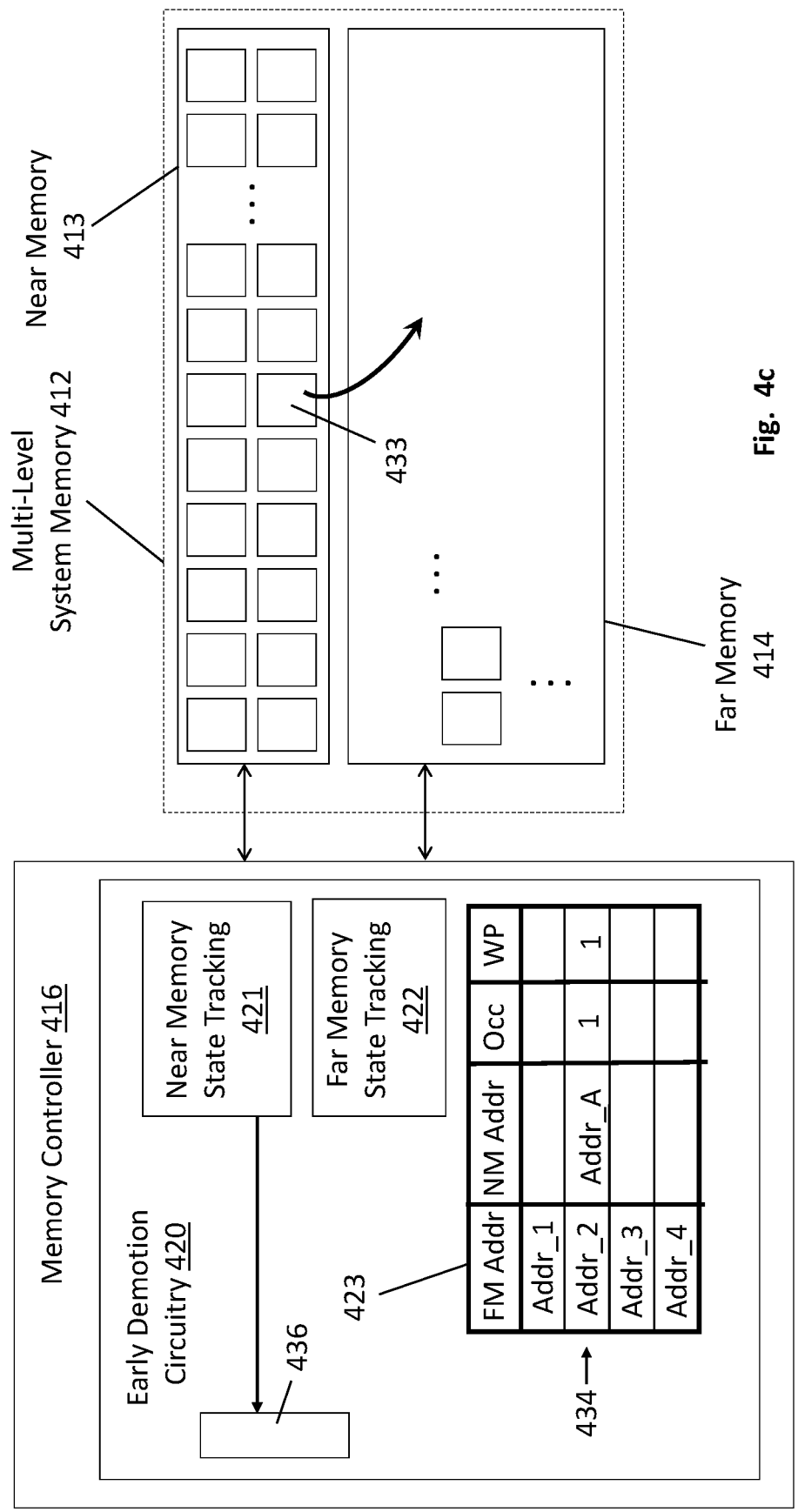

Referring to FIG. 4c, in commencing the early demotion process, the early demotion logic 420 identifies a page 433 for demotion and refers to the far memory state tracking circuit 422 which tracks the current activity of the memory resources associated with the addresses 431 of the far memory free page spaces provided earlier by system software and listed in the early demotion mapping buffer 423. For each free page address that is listed in the early demotion mapping buffer 423, the far memory state tracking circuit 422 tracks whether the memory channel and/or memory rank and/or memory chip (e.g., in stacked memory solutions) that is utilized to store the listed free page within far memory is currently idle (e.g., not engaged in a read/write access).

As soon as a free page listed in the buffer 423 is also recognized as currently having idle far memory resources, the memory controller 416 updates it corresponding entry 434 in the buffer: 1) to include the near memory address ("Addr_A") where the page 433 being demoted was stored in near memory; 2) set both its occupied bit ("Occ") and its write protection bit ("WP") to 1. The setting of the occupied bit means the entry is valid and should not be removed or written over. The setting of the write protection bit means that the page 433 being demoted should not be written to because it is currently in transit from the near memory 413 to the far memory 414. Here, write requests received by the memory controller 416 are queued (not serviced) so long as the write protection bit is set.

The memory controller 416 also begins the process of reading the page 433 from near memory 413 and writing it into far memory 414. Depending on the state of the page's migration from near memory 413 to far memory 414, any read requests received by the memory controller 416 during the migration may be serviced from near memory 413, internally from the memory controller 416 if it has possession of the targeted chunk of the page, or far memory 414. In various embodiments, read accesses that target the migrating page received by the memory controller 416 after the first write request to be received that targets the migrating page 433 are also queued, or, serviced if they do not conflict (have same or overlapping target address space) as any queued write request that targets the migrating page 433.

Figure 4D:
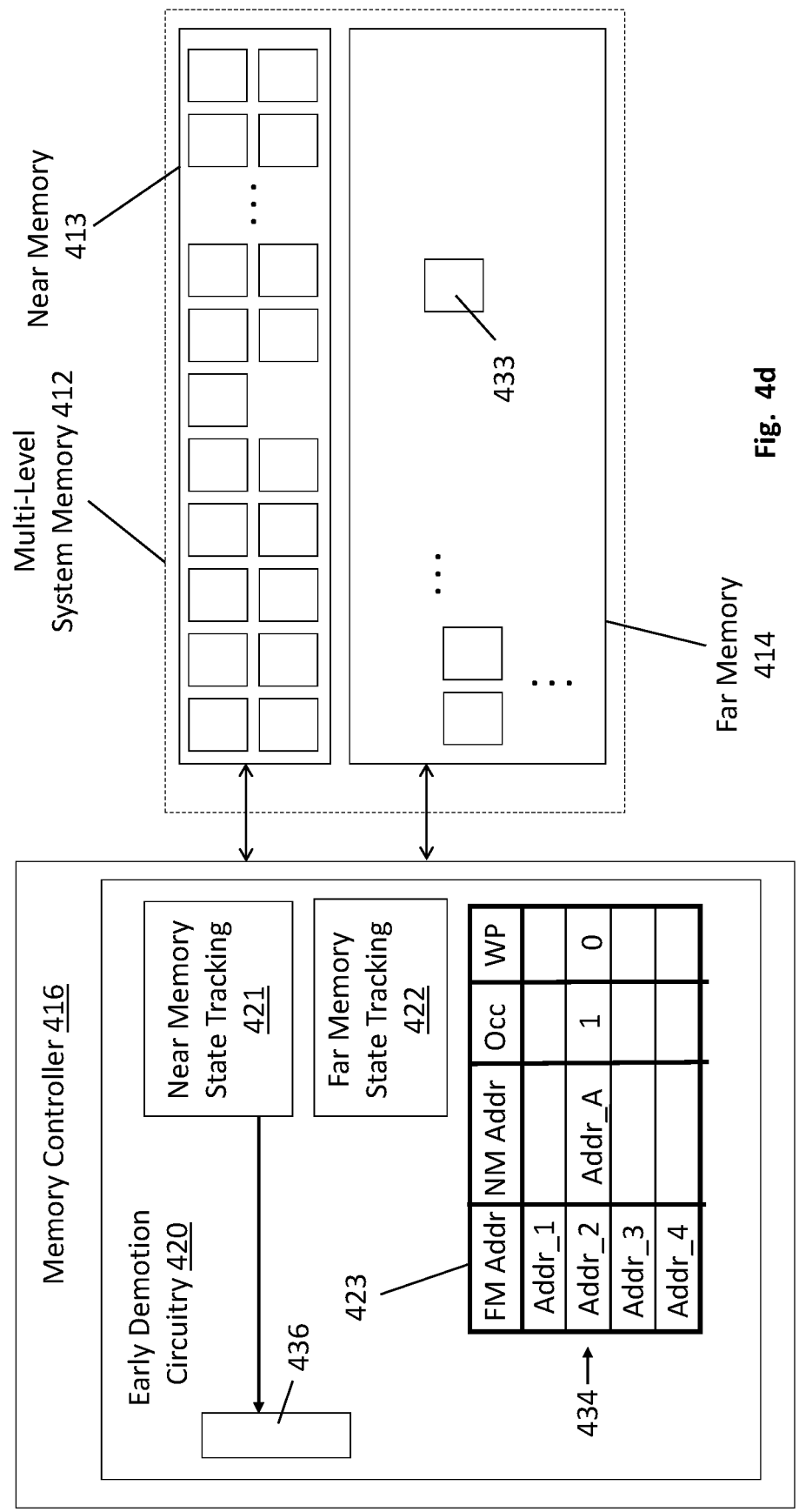

Referring to FIG. 4d, after the page 433 has been successfully written into far memory 414, the write protection bit is reset to 0, which, in turn, permits all read or write accesses that target the page 433 (including queued requests and/or new requests) to be redirected to the page 433 in far memory 414. Here, all such requests will identify the old near memory address ("Addr_A") for the page as the target of the request. For these requests, the entry in the early demotion buffer 423 is used as a look-up table to identify the location where the page is now located ("Addr_2") and the requests are redirected there. Notably, the occupied bit is still set to 1 because the TLB entries that reflect the demotion of the page 433 have not been updated yet.

Figure 4E:
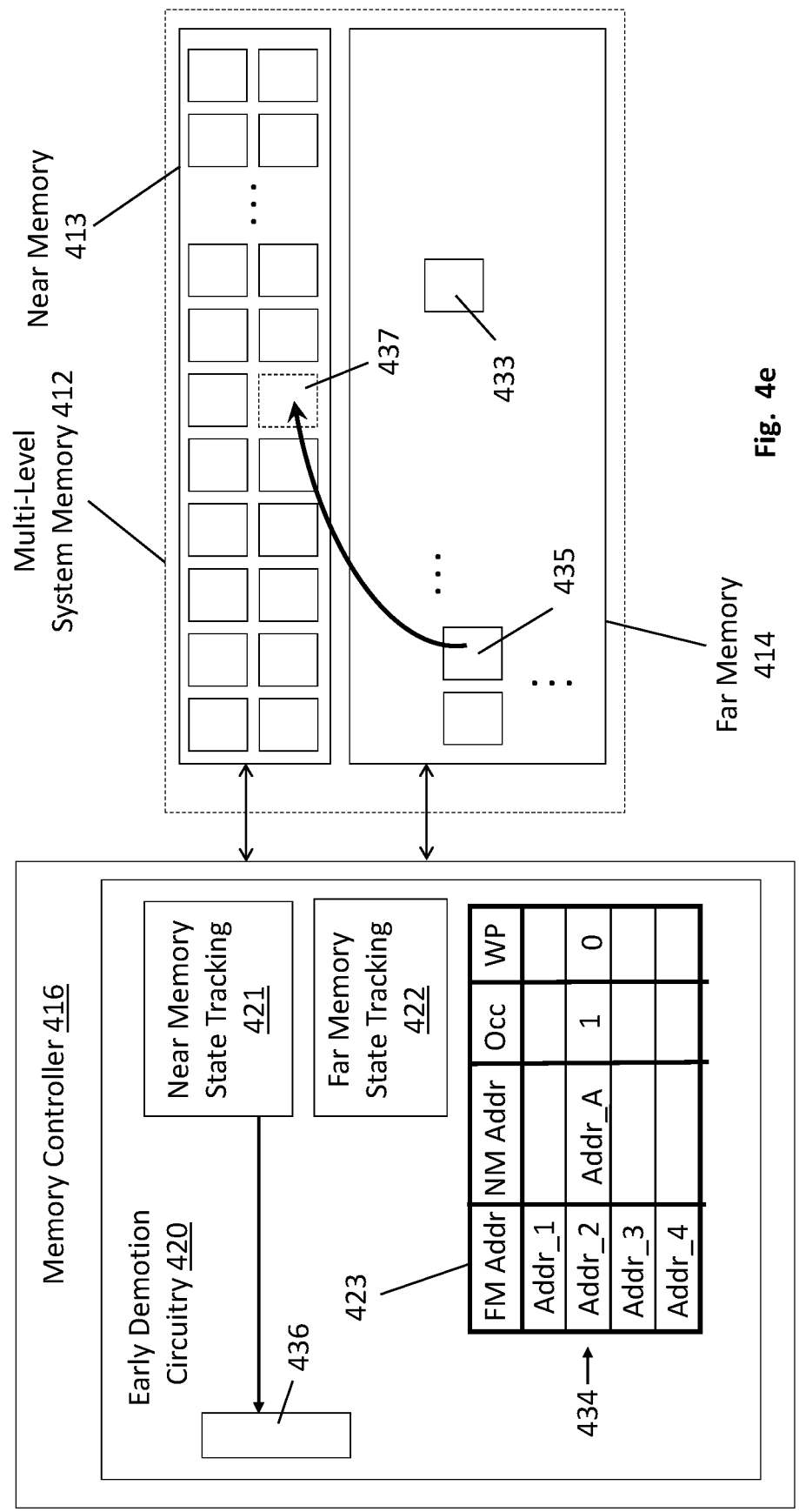

Referring to FIG. 4e, a command is received by the memory controller to promote a page 435 from far memory 414 to near memory 413. Here, because space exists in the near memory 413 owing to the aforementioned earlier demoted page 433, the promoted page 435 is able to be written into near memory 413 without having to wait for a page to be demoted. Thus the promoted page 435 is able to be accessed from the faster near memory 413 sooner than the system of FIG. 2.

In an embodiment, the early demotion circuit 420 makes available to the system software (e.g., by way of register space 436 that is readable by the system software) the addresses of the pages that the near memory state tracking circuitry 421 has identified as being next-in-line for eviction. As such, assuming the system software had read these addresses before the system software knew that page 435 was to be promoted to near memory 413, the system software would have known the address of free space 437 because it had read it from register 436 beforehand. As such, in various embodiments, when the system software/CPU issues a command to promote a page from far memory 414 to near memory, it also identifies the address of the free space in near memory 413 which it had previously read from the memory controller 416 as the destination for the page. The system software may also update the TLB to reflect the new near memory address of the promoted page 435.

Figure 4F:
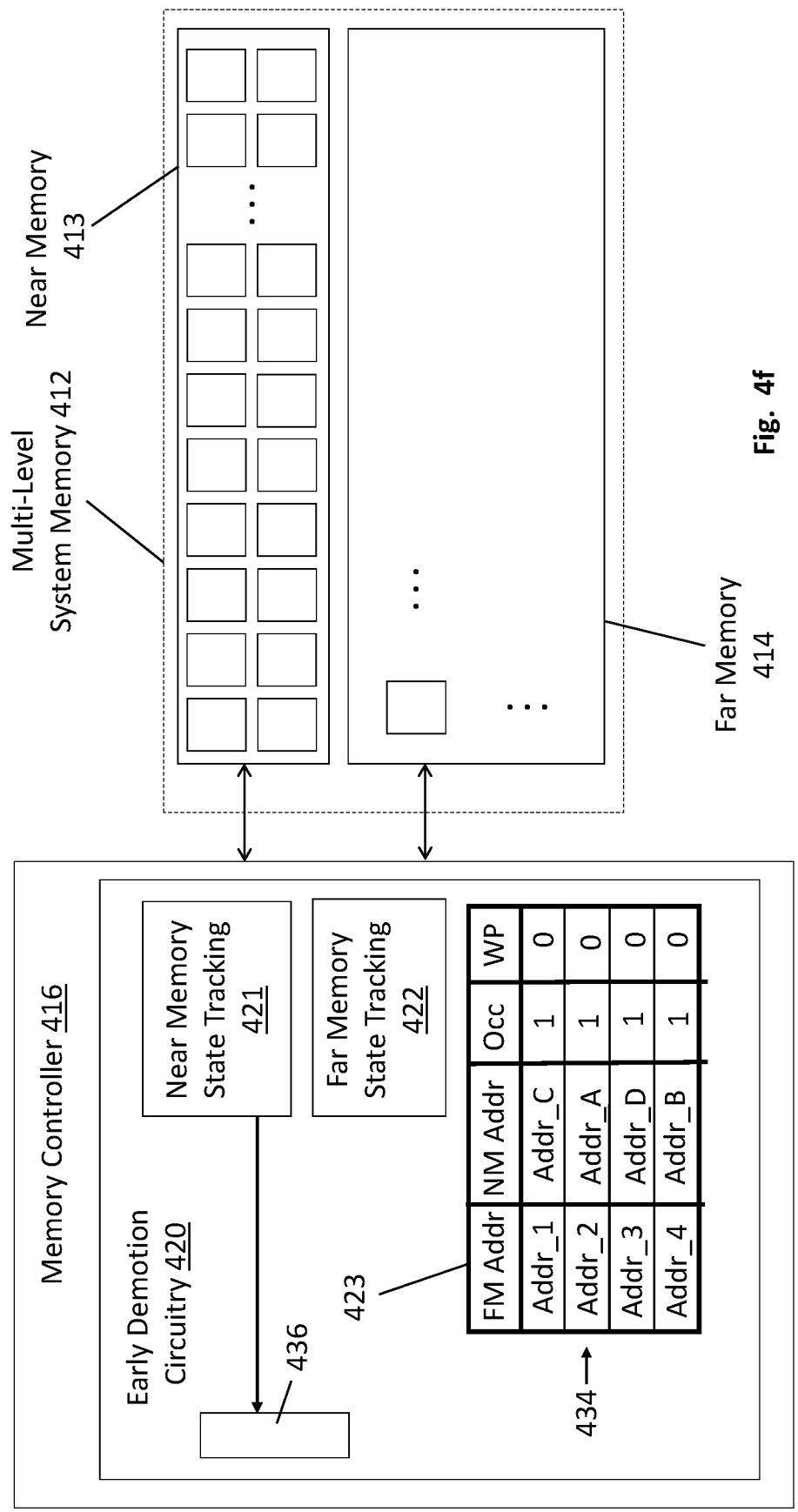

FIG. 4f shows a subsequent state after additional page demotions have occurred as described above for other pages. Here, the early demotion buffer 423 is shown as having multiple valid entries (occupied bits are set to 1) which means their corresponding page demotions have not yet been updated into the CPU TLBs. As such, throughout the time period from FIG. 4e through FIG. 4f, multiple requests may have been received by the memory controller 416 which targeted the demoted pages' old near memory address and that where redirected to their new far memory address through a look-up within the early demotion buffer 423. The write protection bits have all been reset to 0 which means as of the state of FIG. 4f the page demotions are complete (the demoted pages have all been fully and successfully written into far memory).

The system software then reads the contents of the early demotion buffer 423 having occupied bits set equal to 1. Here, each page demotion to have occurred from the system state of FIG. 4a through the system state of FIG. 4f has a representative entry in the buffer 423 with its occupied bit set to 1. The system software then updates the TLBs in the CPUs with the new translation information contained in the early demotion buffer 423. Specifically, for each page having a current page address in a TLB that matches the page's old near memory address in the buffer 423, the system software will replace the old near memory address with the new far memory address. As described above, all of the entries in the buffer are used to update the TLBs as a batch so as to economize the TLB updating process. In various embodiments, so doing may/will cause the TLB to flush its contents.

Figure 4G:
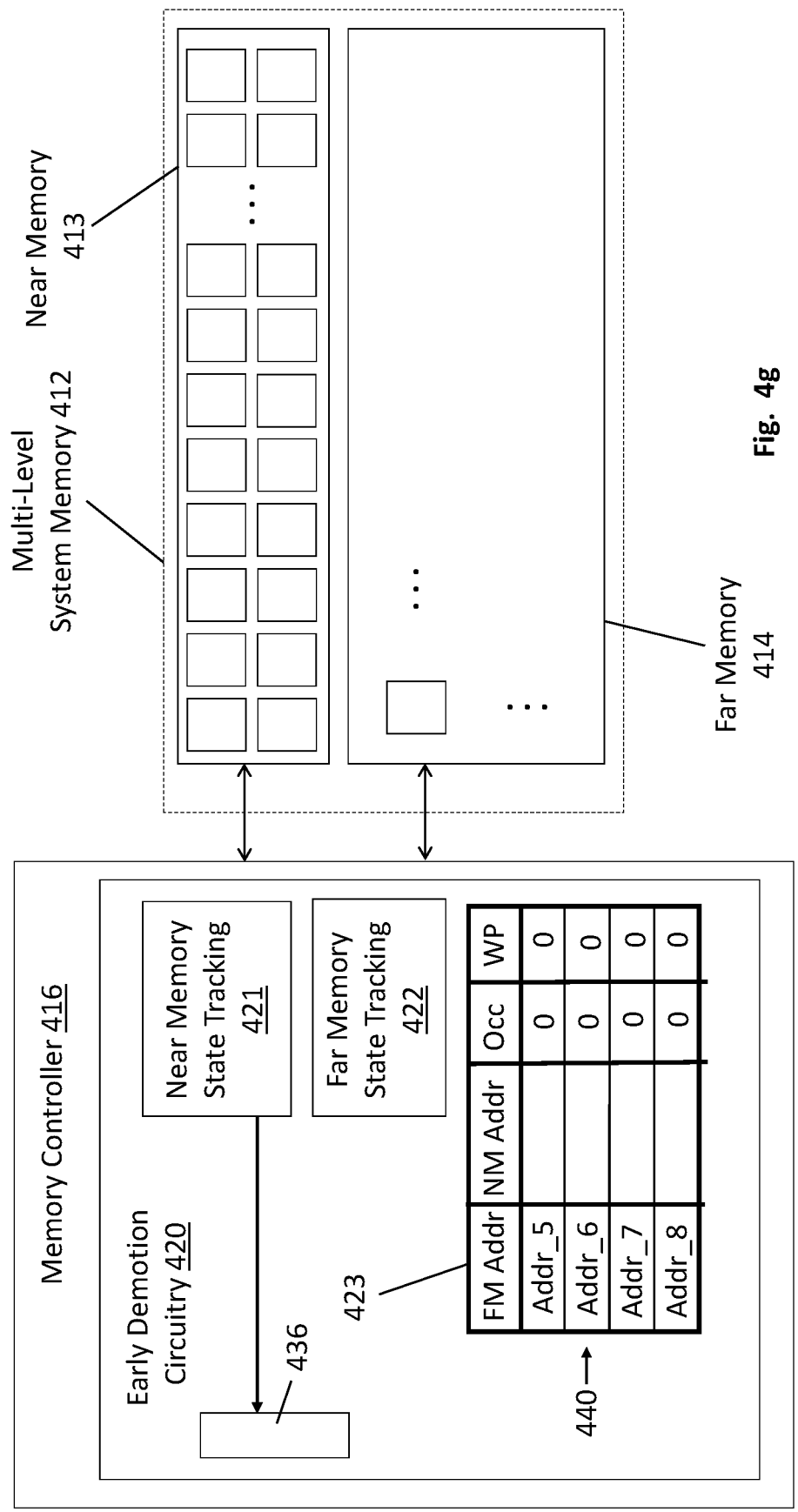

In an embodiment, the system software reads the contents of the buffer 423 in response to the buffer 423 having a threshold number of entries with occupied bit set to 1 and write protection bit set to 0 (which means a threshold number of entries are waiting for their respective TLB entries to be updated). By reading buffer entries after such a threshold has been passed, batch TLB update processing naturally follows. Referring to FIG. 4g, after the TLB entries have been updated, system software clears the occupied bits from 1 to 0 and provides a new set of free page addresses 440 in far memory, in which case, the system state returns to a state that is akin to the system state of FIG. 4a.

Note that the early demotion logic circuitry 320, 420 described above and any/all of its constituent components (near memory tracking circuitry, far memory tracking circuitry and early demotion buffer) may be integrated with logic circuitry that is designed to execute some form of program code (e.g., embedded processor, embedded processor, etc.), dedicated hardwired logic circuitry (e.g., application specific integrated circuit (ASIC) circuitry), programmable logic circuitry (e.g., field programmable logic circuitry (FPGA), programmable logic device (PLD)) or any combination or logic circuitry that executes program code, dedicated hardwired logic circuitry or programmable logic circuitry.

Figure 5:
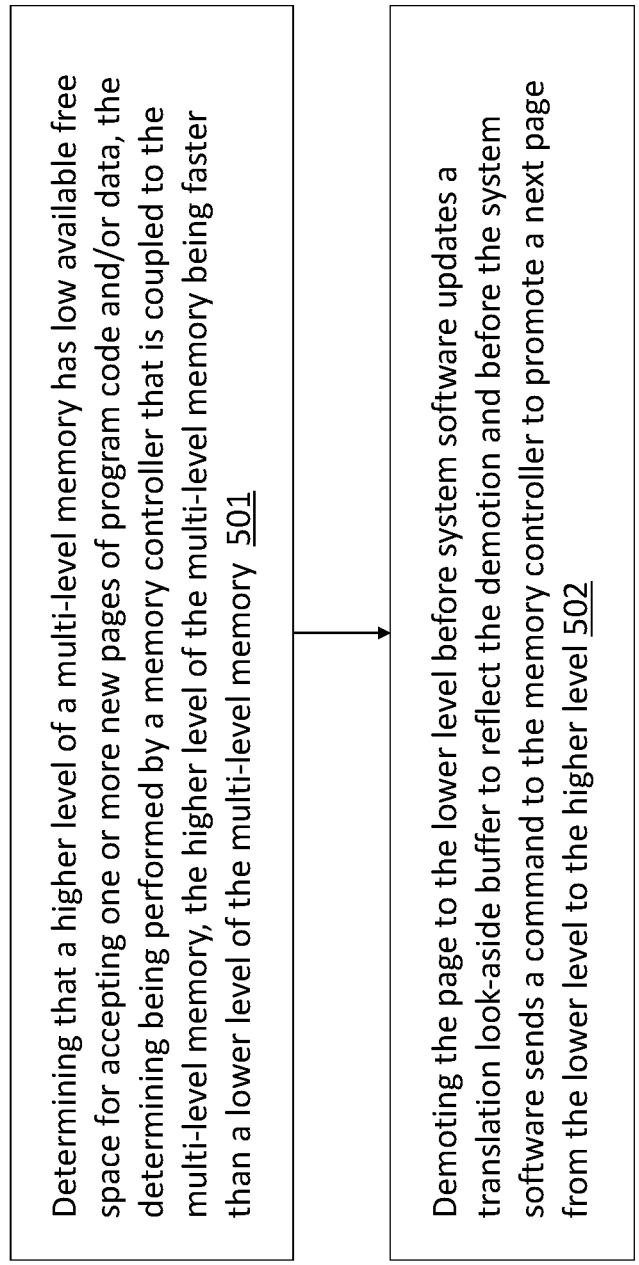
FIG. 5 shows an early page demotion method.

FIG. 5 provides a method described above. The method includes determining 501 that a higher level of a multi-level memory has low available free space for accepting one or more new pages of program code and/or data, the determining being performed by a memory controller that is coupled to the multi-level memory, the higher level of the multi-level memory being faster than a lower level of the multi-level memory. The method also includes demoting 502 the page to the lower level before system software updates a translation look-aside buffer to reflect the demotion and before the system software sends a command to the memory controller to promote a next page from the lower level to the higher level.

Figure 6:
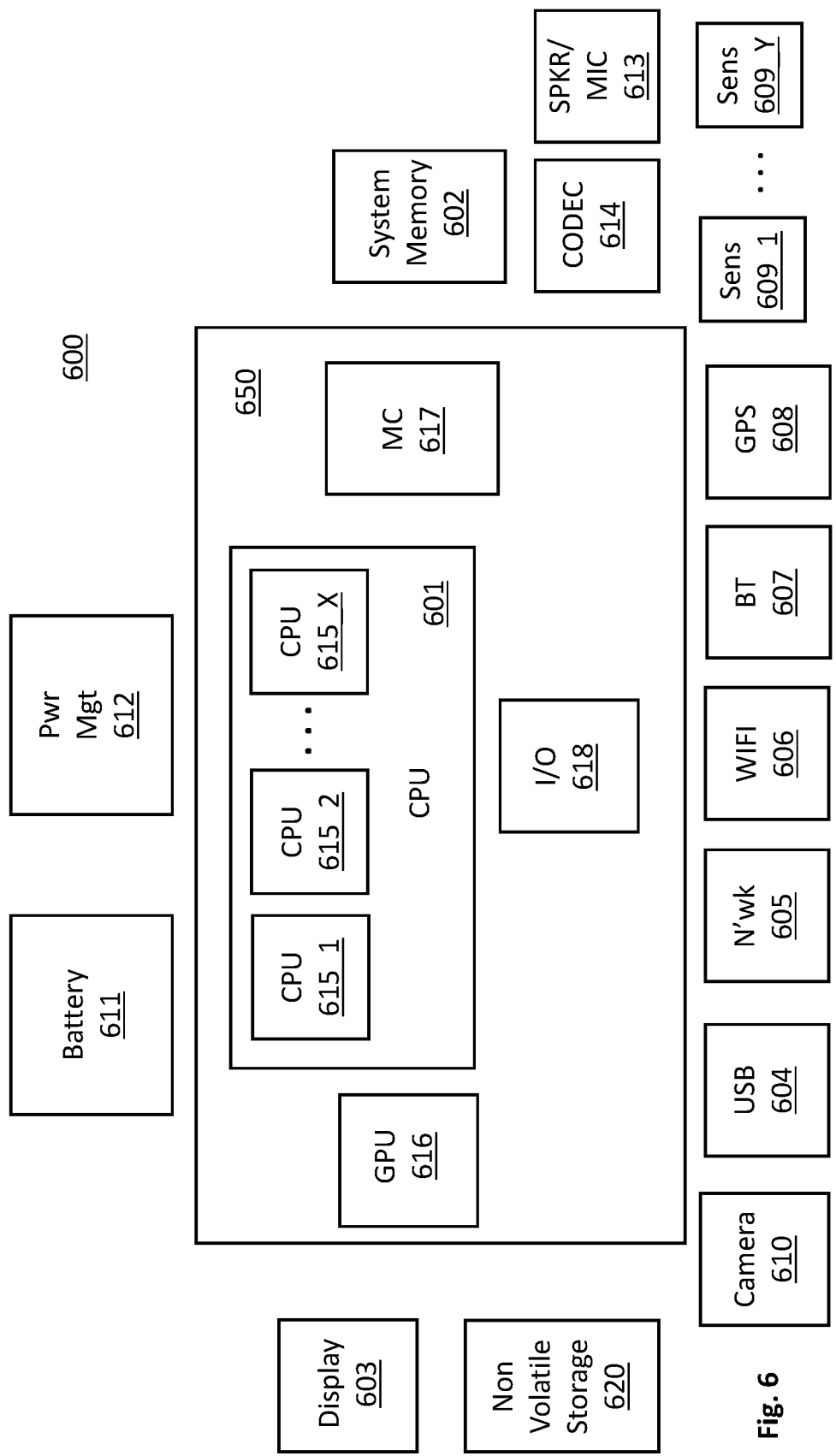
FIG. 6 shows a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit 601 (which may include, e.g., a plurality of general purpose processing cores 615_1 through 615_X) and a main memory controller 617 disposed on a multi-core processor or applications processor, system memory 602, a display 603 (e.g., touchscreen, flat-panel), a local wired point-to-point link (e.g., USB) interface 604, various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a memory management function 617 (e.g., a memory controller) and an I/O control function 618. The general purpose processing cores 615 typically execute the system and application software of the computing system. The graphics processing unit 616 typically executes graphics intensive functions to, e.g., generate graphics information that is presented on the display 603.

The memory control function 617 interfaces with the system memory 602 to write/read data to/from system memory 602. The system memory may be implemented as a multi-level system memory. The memory controller may include special hardware that demotes pages from a higher level to a lower level of system memory ahead of a page promotion from the lower to the higher level when the higher level is keeping a high concentration of pages as described in detail above.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The power management control unit 612 generally controls the power consumption of the system 600.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. An apparatus, comprising:
a memory controller to couple to a multi-level memory characterized by a faster higher level and a slower lower level and in which system software determines which pages are to occupy the higher level, the memory controller comprising early demotion logic circuitry to demote a page from the higher level to the lower level without system software having to instruct the memory controller to demote the page, without the page passing through an intermediate page location in either the higher or lower levels during the demotion, and without the memory controller informing system software of the page's demotion as a condition for proceeding with the page's demotion, and before the system software promotes another page from the lower level to the higher level, wherein, the memory controller further comprises a), b) and c) below:
a) a buffer storage region to hold respective lower level addresses received from the system software before the page's demotion, the memory controller to select one of the lower level addresses to establish a new lower level address for the page;
b) upper level tracking circuitry to determine that the upper level has insufficient available free space to accept one or more new pages of program code and/or data and to identify the page for demotion from the upper level as a consequence, the upper level tracking circuitry being dedicated hardwired logic circuitry within the memory controller;
c) lower level tracking circuitry to monitor when memory resources within the lower level that the respective lower level addresses map to become idle, the memory controller to begin the demotion of the page from the upper level when a memory resource of the memory resources that the new lower level address maps to is idle, the lower level tracking circuitry being dedicated hardwired logic circuitry within the memory controller.

2. The apparatus of claim 1 wherein the buffer storage region is to store entries of early demoted pages, an entry of the entries to identify the page's old higher level address and the new lower level address.

3. The apparatus of claim 2 wherein the memory controller is to reference the buffer storage region to redirect, to the new lower level address, read and/or write requests that target the page and that specify the old higher level address.

4. The apparatus of claim 2 wherein the entry further comprises a write protect bit to prevent writing to the page while the page is being demoted.

5. The apparatus of claim 2 wherein the entry further comprises an occupied bit to specify whether or not the new lower level address has been updated into a translation look-aside buffer.

6. A computing system, comprising:
one or more processing cores comprising respective translation look-aside buffers;
a multi-level memory characterized by a faster higher level and a slower lower level and in which system software determines which pages are to occupy the higher level;
a memory controller between the one or more processing cores and the multi-level memory, the memory controller comprising early demotion logic circuitry to demote a page from the higher level to the lower level without the memory controller informing system software of the page's demotion as a condition for proceeding with the page's demotion, and without the page passing through an intermediate page location in either the higher or lower levels during the demotion, and without system software executing on the one or more processing cores having to instruct the memory controller to demote the page, wherein, the memory controller further comprises a), b) and c) below:
a) a buffer storage region to hold respective lower level addresses received from the system software before the page's demotion, the memory controller to select one of the lower level addresses to establish a new lower level address for the page;
b) upper level tracking circuitry to determine that the upper level has insufficient available free space to accept one or more new pages of program code and/or data and to identify the page for demotion from the upper level as a consequence, the upper level tracking circuitry being first dedicated hardwired logic circuitry within the memory controller;
c) lower level tracking circuitry to monitor when memory resources within the lower level that the respective lower level addresses map to become idle, the memory controller to begin the demotion of the page from the upper level when a memory resource of the memory resources that the new lower level address maps to is idle, the lower level tracking circuitry being second dedicated hardwired logic circuitry within the memory controller.

7. The computing system of claim 6 wherein the buffer storage region is to store entries of early demoted pages, an entry of the entries to identify the page's old higher level address and the new lower level address.

8. The computing system of claim 7 wherein the memory controller is to reference the buffer storage region to redirect, to the new lower level address, read and/or write requests that target the page and that specify the old higher level address.

9. The computing system of claim 7 wherein the entry further comprises a write protect bit to prevent writing to the page while the page is being demoted.

10. The computing system of claim 7 wherein the entry further comprises an occupied bit to specify whether or not the new lower level address has been updated into a translation look-aside buffer.

11. A method, comprising:
performing the below with dedicated hardwired logic circuitry of a memory controller that interfaces with a multi-level memory having a higher level and a lower level, the higher level of the multi-level memory being faster than the lower level of the multi-level memory, wherein, system software determines which pages are to occupy the higher level:
receiving lower level addresses from system software that are available to receive demoted pages;
determining that the higher level of the multi-level memory has insufficient available free space to accept one or more new pages of program code and/or data;
identifying a page within the higher level of the multi-level memory for demotion;
tracking usage of lower level memory resources that the lower level addresses map to;
selecting one of the lower level addresses whose respective lower level memory resources are idle as the lower level address where the page is to be demoted to;
demoting the page to the lower level of the multi-level memory at the lower level address without the page passing through an intermediate page location in either the higher level or the lower level during the demotion, without informing the system software of the page's demotion as a condition for proceeding with the page's demotion, and before system software updates a translation look-aside buffer to reflect the demotion, and before the system software sends a command to the memory controller to promote a next page from the lower level of the multi-level memory to the higher level of the multi-level memory; and
making the lower level address for the page visible to the system software.

12. The method of claim 11 further comprising the system software updating the translation look-aside buffer to reflect the demotion after the demotion has been completed.

13. The method of claim 11 further comprising the system software updating the translation look-aside buffer with a batch of updates to reflect a plurality of demotions.

14. The method of claim 11 further comprising the memory controller receiving the lower level addresses after updating translation look-aside buffer entries with an earlier batch of updates for demotions that occurred prior to the demoting of the page.

15. The method of claim 11 wherein the memory controller is a component of a multi-core processor that comprises a plurality of processing cores.

* * * * *